April 13, 1954     J. DICKSON     2,674,904

CAMSHAFT

Filed April 22, 1950

Inventor
John Dickson
By Willits, Helmig & Baillio
Attorneys

Patented Apr. 13, 1954

2,674,904

UNITED STATES PATENT OFFICE 2,674,904

CAMSHAFT

John Dickson, Huntington Woods, Mich., assignor to General Motors Corporation, Detroit, Mich., a corporation of Delaware Application April 22, 1950, Serial No. 157,612

1 Claim. (Cl. 74—573)

This invention relates to shafts and bearings therefor and particularly to a camshaft or the like of an internal combustion engine wherein the shaft is subject to flexure and the end journals and/or bearings are so designed as to provide uniform bearing contact between the journal and bearing surfaces during rotation of the shaft.

In the past when a shaft, such as a camshaft or a balance shaft had an end provided with an eccentric balance weight, centrifugal force due to the rapidly rotating balance weight caused the weighted end of the shaft to flex outwardly. This flexure resulted in the creation of high pressure contact areas between cylindrical end journals and plane bearings adjacent their end portions, thereby causing the bearing surfaces to rapidly become excessively scored and bell-mouthed.

A principal object of the invention, therefore, is to more uniformly distribute the pressure between the end bearing and journal during rotation of a shaft having an eccentric end weight by either providing the shaft adjacent its weighted end with a journal having its peripheral surface inwardly tapered toward the weighted end of the shaft or by outwardly tapering the end bearing surface in the same direction, or by combining these two methods. In this manner the flexed end journal portion of the shaft maintains uniform line contact with the bearing during operation, both when the machine is first placed in operation and after long use. By thus providing a uniform bearing contact throughout the length of the bearing and journal, the life of the bearing surface is prolonged by eliminating excessive scoring and uneven wear.

Moreover, the uniform line contact thereby provided between the journal and the bearing surface, resulting from the progressively greater peripheral clearance adjacent the eccentrically weighted end, permits the oil to be more efficiently carried and distributed between these members during shaft rotation. The resultant superior lubrication further contributes to the longer life of the bearing surface.

Figure 1:
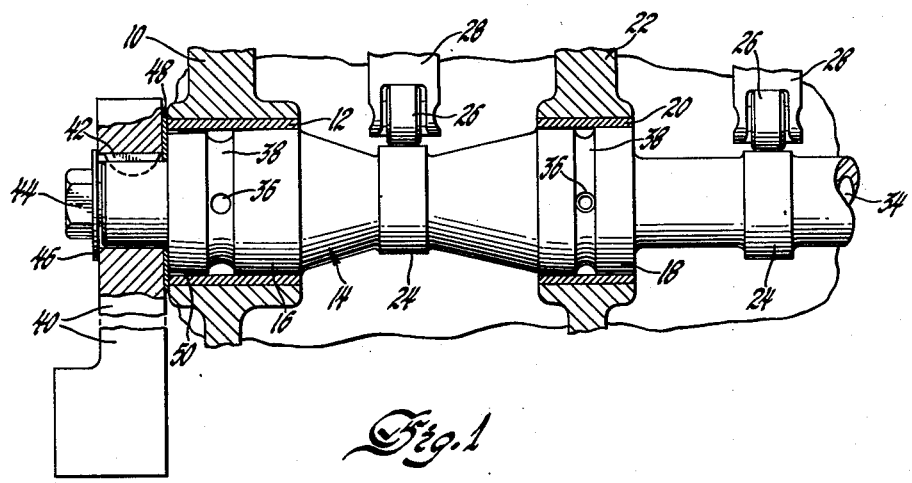
Figure 2:
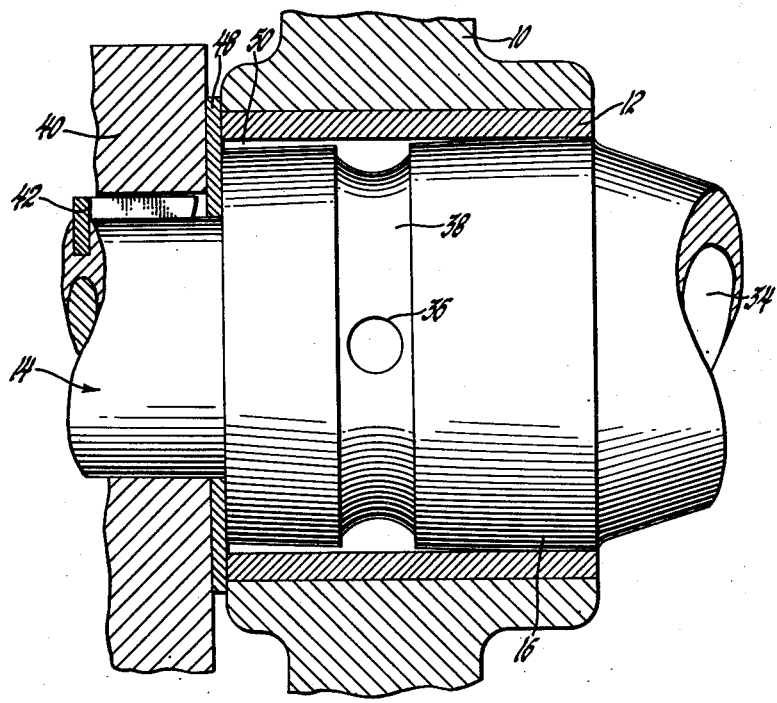

Other objects and advantages of the invention will more fully appear from the following description taken in conjunction with the accompanying drawing, in which:

Figure 1 is a fragmentary longitudinal view, partly in elevation and partly in section, of a camshaft and bearing of an internal combustion engine; and Figure 2 is an enlarged fragmentary view, partly in elevation and partly in section, of the camshaft end journal and bearing shown in Figure 1.

Referring to the drawing, Figure 1 shows a portion of an internal combustion engine provided with an end bearing support 10 in which an end bearing sleeve or bushing 12 is suitably fixed. A hollow camshaft, generally indicated by 14, is shown provided with an integral end journal 16 rotatably mounted in bearing sleeve 12. Intermediate journals 18 may be similarly formed along the length of the shaft and rotatably seated in intermediate bearing sleeves or bushings 20 fitted in intermediate bearing supports 22.

Interjacent the bearings, the shaft is shown as provided with integral cams 24, which actuate the rollers 26 of cam followers or tappets 28 of an oil injector, not shown.

A passage 34, which for convenience in manufacture extends completely through the camshaft 14, functions to conduct oil to the bearings. Lubrication of the bearing surfaces may be accomplished, as shown in the drawing, by the inclusion of radially extending oil distribution ducts 36, which provide communication between the longitudinal oil passage 34 and the annular oil grooves 38 in the journals.

An eccentric balance weight or counterweight 40 is mounted on the end of the shaft 14 and locked thereto by means of a key 42 and an externally threaded screw or plug 44, which may engage internal threads in the hollow shaft. The key prevents rotational movement of the balance weight with respect to the shaft, while the plug, in conjunction with a washer 46 shown as radially overlapping the cylindrical opening in the balance weight, aids in preventing relative axial movement of the weight and shaft. The plug 44 and washer 46, furthermore, serve to seal the end of the oil passage 34. Frictional resistance between the rotating balance weight 40 and the bushing 12 and bearing support 10 is reduced by the provision of a thrust bearing or washer 48.

As best shown in Figure 2, the end bearing sleeve or bushing 12 has a conventional cylindrical inner bearing surface, but the end journal 16 riding therein has its peripheral surface inwardly tapered toward the balance weight end of the shaft, thereby defining with the bearing sleeve an annular tapering clearance 50. This construction permits the end journal of a shaft whose end portion is subject to flexure during operation, such as flexure caused by the rapidly rotating end balance weight 40, to maintain uniform line bearing contact with the bearing sleeve 12 throughout the length of these members. This arrangement further facilitates oil distribution from the ducts 36 to provide more efficient lubrication of the bearing surfaces and prolong the life of the bearing.

For purposes of description the size of the clearance 50 has been exaggerated in the drawing. As a practical matter, only a relatively small clearance is necessary, the actual clearance used being proportional to the assumed deflection of the shaft. This in turn, of course, will be governed in each case by such considerations as the dimensions and material of the shaft, the number and location of supporting bearings, the speed of shaft rotation, and the location, size and shape of the balance weight 40.

The intermediate journals 18 and bearing sleeves 20 may conveniently be of conventional cylindrical construction.

It will be realized that the end bearing sleeve 12, rather than the end journal 16, could be provided with a taper, without departing from the spirit and scope of the invention. Thus modified, the journals could be of a conventional cylindrical form and the end bearing sleeve provided with an inner surface which tapers outwardly toward the weighted end of the shaft. This arrangement would produce a result similar to that effected by the arrangement shown in the drawing, but ease of manufacture favors the latter construction.

It will be further understood, of course, that the end bearing support 10 and the bearing sleeve 12 could equally well be integral, the dimensional relationship between the journal and the bearing member being the critical important factor.

While the described embodiment of the present invention constitutes a preferred form, it is to be understood that other forms might be adopted, all coming within the scope of the following claim.

I claim:

In an internal combustion engine having a rotatively driven shaft including a plurality of longitudinally spaced annular externally journalled surfaces and terminating at one end at a distance from the journalled surface nearest said end, said shaft being hollow and each of said journalled surfaces being circumferentially relieved by an annular oil groove having a radial oil supply passage connecting the groove with the interior of the shaft, journalling means for the shaft including plain cylindrical bearings longitudinally coextensive with and embracing the respective journal surfaces on each side of said grooves, and an engine balance weight mounted eccentrically on said shaft end for rotation therewith and having sufficient mass to cause beamwise flexure of the shaft during the rotation thereof, a thrust member coaxially mounted on said shaft intermediate said weight and said adjacent journalled surface, said nearest adjacent journalled surface having a diameter closely fitting its bearing at the end thereof farthest from said shaft end and tapering inwardly of the shaft and toward said shaft end to maintain substantially uniform load distribution longitudinally of its bearing during said flexure of the shaft in rotation, said thrust member forming an oil seal at the tapered end of said journal surface.

References Cited in the file of this patent

UNITED STATES PATENTS

| Number | Name | Date |
|---|---|---|
| 1,634,123 | Taub | June 28, 1927 |
| 1,783,664 | McGovern | Dec. 2, 1930 |
| 1,916,522 | McCuen | July 4, 1933 |
| 2,344,275 | Straub | Mar. 14, 1944 |

FOREIGN PATENTS

| Number | Country | Date |
|---|---|---|
| 107,213 | Austria | 1927 |